(12) United States Patent
Dickenscheid

(10) Patent No.: US 7,370,640 B2
(45) Date of Patent: May 13, 2008

(54) FUEL FEED UNIT

(75) Inventor: Lothar Dickenscheid, Ockenheim (DE)

(73) Assignee: Siemens Aktiengesellschaft, München (DE)

( * ) Notice: Subject to any disclaimer, the term of this patent is extended or adjusted under 35 U.S.C. 154(b) by 54 days.

(21) Appl. No.: 10/586,516

(22) PCT Filed: Dec. 20, 2004

(86) PCT No.: PCT/EP2004/053602

§ 371 (c)(1),
(2), (4) Date: Jul. 18, 2006

(87) PCT Pub. No.: WO2005/070719

PCT Pub. Date: Aug. 4, 2005

(65) Prior Publication Data

US 2007/0151609 A1    Jul. 5, 2007

(30) Foreign Application Priority Data

Jan. 21, 2004  (DE) .................... 10 2004 003 114

(51) Int. Cl.
*F02M 37/04* (2006.01)
(52) U.S. Cl. .................... 123/510; 123/511; 123/514
(58) Field of Classification Search ............... 123/510, 123/511, 514, 497
See application file for complete search history.

(56) References Cited

U.S. PATENT DOCUMENTS

| 4,860,714 | A | * | 8/1989 | Bucci | .................... | 123/514 |
|---|---|---|---|---|---|---|
| 5,289,810 | A | | 3/1994 | Bauer et al. | | |
| 5,564,397 | A | * | 10/1996 | Kleppner et al. | ............ | 123/514 |
| 5,692,479 | A | * | 12/1997 | Ford et al. | .................... | 123/514 |
| 5,715,798 | A | * | 2/1998 | Bacon et al. | ................ | 123/514 |
| 5,791,317 | A | | 8/1998 | Eck | | |
| 6,068,022 | A | * | 5/2000 | Schultz et al. | ............... | 137/538 |
| 6,343,589 | B1 | * | 2/2002 | Talaski et al. | ............... | 123/514 |
| 2002/0043253 | A1 | | 4/2002 | Begley et al. | | |
| 2003/0118455 | A1 | * | 6/2003 | Vilela et al. | ................ | 417/189 |
| 2003/0226548 | A1 | | 12/2003 | Herzog et al. | | |
| 2006/0231079 | A1 | * | 10/2006 | Paluszewski | ................ | 123/514 |

FOREIGN PATENT DOCUMENTS

| DE | 42 24 981 A1 | 2/1994 |
|---|---|---|
| DE | 195 04 217 A1 | 8/1996 |
| DE | 197 19 607 A1 | 9/1998 |
| DE | 102 15 652 A1 | 11/2003 |
| EP | 0 819 843 A2 | 1/1998 |
| EP | 0 864 458 A1 | 9/1998 |
| EP | 1 199 464 A2 | 4/2002 |
| WO | WO 03/084775 A2 | 10/2003 |

* cited by examiner

*Primary Examiner*—Thomas Moulis
(74) *Attorney, Agent, or Firm*—Cohen Pontani Lieberman & Pavane LLP

(57) ABSTRACT

The invention relates to a fuel feed unit (2) for a motor vehicle, comprising a volume flow reducing valve (13, 14) that is mounted in a pump fluid line (11, 12) leading to a suction jet pump (5, 6). Said volume flow reducing valve (13, 14) reduces the fuel volume flow supplied to the suction jet pump (5, 6) when the feed pressure of the fuel pump (4) increases, thereby avoiding unnecessary feed of fuel to the suction jet pump (5, 6).

6 Claims, 1 Drawing Sheet

FUEL FEED UNIT

BACKGROUND OF THE INVENTION

The invention relates to a fuel feed unit for feeding fuel from a fuel tank, having a fuel pump drawing in fuel from a swirl pot, a suction jet pump feeding fuel from the fuel tank into the swirl pot, and a pump fluid line led to the suction jet pump from the delivery side of the fuel pump.

Such fuel feed units are commonly used in modern motor vehicles and are known in practice. The suction jet pumps are supplied with fuel by the fuel pump and feed fuel from the fuel tank into a swirl pot of the fuel feed unit, for example. In the known feed units fuel is delivered irrespective of whether fuel is present in the swirl pot.

The suction jet pump, particularly in demand-controlled feed units, in which the delivery capacity of the fuel pump is controlled as a function of the fuel demand of an internal combustion engine of the motor vehicle, is designed in such a way that it delivers sufficient fuel even in the event of a low delivery pressure of the fuel pump. This means, however, that in most operating states the suction jet pump receives an unnecessarily large amount of fuel as pump fluid, which requires the use of an especially high-performance pump unit.

DE 195 04 217 A1 discloses a fuel feed unit having a suction jet pump, in the pump fluid line of which a pressure valve is arranged, downstream of which is a separately arranged restrictor. The function of the pressure valve is to open the pump fluid line only once a specific is attained.

The object of the invention is to develop a fuel feed unit of the aforementioned type so that an unnecessary fuel feed to the suction jet pump is avoided, particularly in demand-controlled feed units.

BRIEF DESCRIPTION OF THE INVENTION

According to the invention this object is achieved in that a pressure-dependent volume flow reducing valve is arranged in the pump fluid line for restricting the fuel volume flow delivered to the suction jet pump as the delivery pressure of the fuel pump increases.

This design means that as the delivery pressure of the fuel pump increases the delivery of fuel to the suction jet pump via the pump liquid line is maintained or restricted. The suction jet pump can therefore be designed for a low fuel pump delivery capacity. Should the delivery capacity of the fuel pump increase due to a rising demand requirement from the internal combustion engine, the volume flow reducing valve reduces the delivery of fuel to the suction jet pump by way of the pump fluid line. This serves to prevent any unnecessary delivery of fuel to the suction jet pump. This allows the fuel feed unit according to the invention to be of especially compact design. The small amount of fuel fed inside the fuel tank furthermore minimizes any permeation of fuel into the surroundings.

According to an advantageous development of the invention, the volume flow reducing valve is of particularly simple design if the volume flow reducing valve has a piston, preloaded by a spring element against the delivery pressure of the fuel pump, if the piston is displaceably arranged in a duct and if a cross-section of an annular gap arranged between the piston and the duct diminishes as the piston is moved against the force of the spring element.

According to an advantageous development of the invention, the cost in design terms of reducing the annular gap in the volume flow reducing valve is particularly reduced if the piston has a section with a widening cross section opposed to a control edge of the duct. In a design that is particularly easy to produce, the section takes the form of a cone.

According to another advantageous development of the invention, the piston can have a cylindrical section that is inexpensive to produce, if the duct has a conical section.

A piston, the diameter of which is substantially smaller than the duct diameter and which has a diameter approximately equal to the duct diameter only in the area of the annular gap and the spring element, achieves especially low flow losses through the volume flow reducing valve.

According to another advantageous development of the invention, the cost of controlling the volume flow reducing valve in response to the pressure prevailing in the fuel tank is particularly minimized if the volume flow reducing valve has an opening provided for arrangement in the fuel tank and if the side of the piston remote from the delivery pressure has a connection to the opening.

Control of the volume flow reducing valve is further facilitated if the piston is preloaded by means of a spring element into its position opening up the pump fluid line.

The need to arrange an additional cold starting valve, which when starting up the fuel pump keeps the pump fluid line closed until a minimum pressure has been reached, is readily avoided if the end of the piston assigned to the annular gap has a seal, which interacts with a seal seat in the duct.

BRIEF DESCRIPTION OF THE DRAWINGS

The invention permits numerous embodiments. In order to further illustrate the basic principle of the invention one such embodiment is represented in the drawing and will be described below. In the drawing.

DETAILED DESCRIPTION OF THE INVENTION

Figure 1:
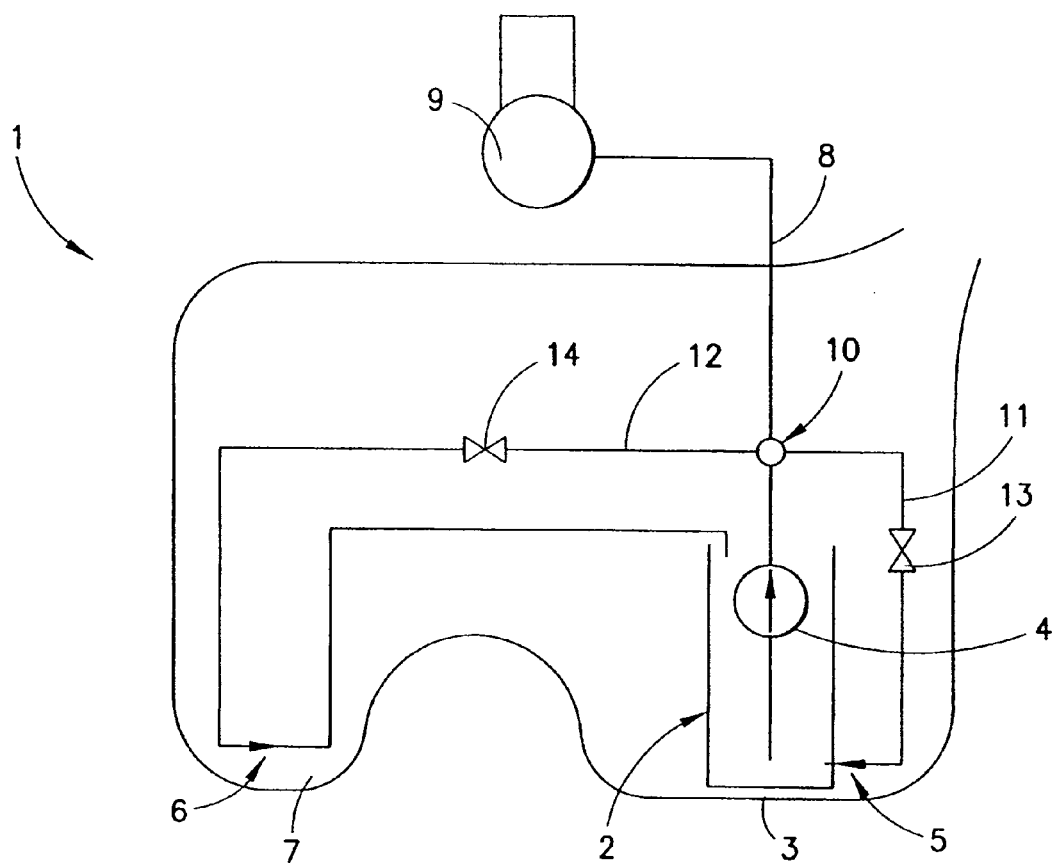
FIG. 1 shows a schematic representation of a fuel feed unit according to the invention arranged in a fuel tank.

FIG. 1 shows a fuel tank 1 in the form of a saddle tank for a motor vehicle having a fuel feed unit 2 arranged therein. The fuel feed unit 2 has a fuel pump 4, drawing in fuel from a swirl pot 3 arranged in the bottom area of the fuel tank 1, and two suction jet pumps 5, 6 for filling the swirl pot 3. One of the suction jet pumps 6 is arranged in a chamber 7 of the fuel tank 1 separated from the swirl pot 3, whilst the other suction jet pump 5 fills the swirl pot 3 with fuel directly surrounding the former. From the delivery side of the fuel pump 4 a feed line 8 leads to an internal combustion engine 9 of the motor vehicle. The fuel pump 4 is controlled as a function of the demand of the internal combustion engine 9.

A distributor 10, to which pump fluid lines 11, 12 leading to the suction jet pumps 5, 6 are connected, is arranged in the feed line 8. These pump fluid lines 11, 12 serve to supply the suction jet pumps 5, 6 with fuel as working fluid. Volume flow reducing valves 13, 14 are arranged in each of the pump fluid lines 11, 12 respectively. The volume flow reducing valves 13, 14 reduce the volume flow of fluid delivered to the suction jet pumps 5, 6 as the delivery pressure of the fuel pump 4 increases.

Figure 2:
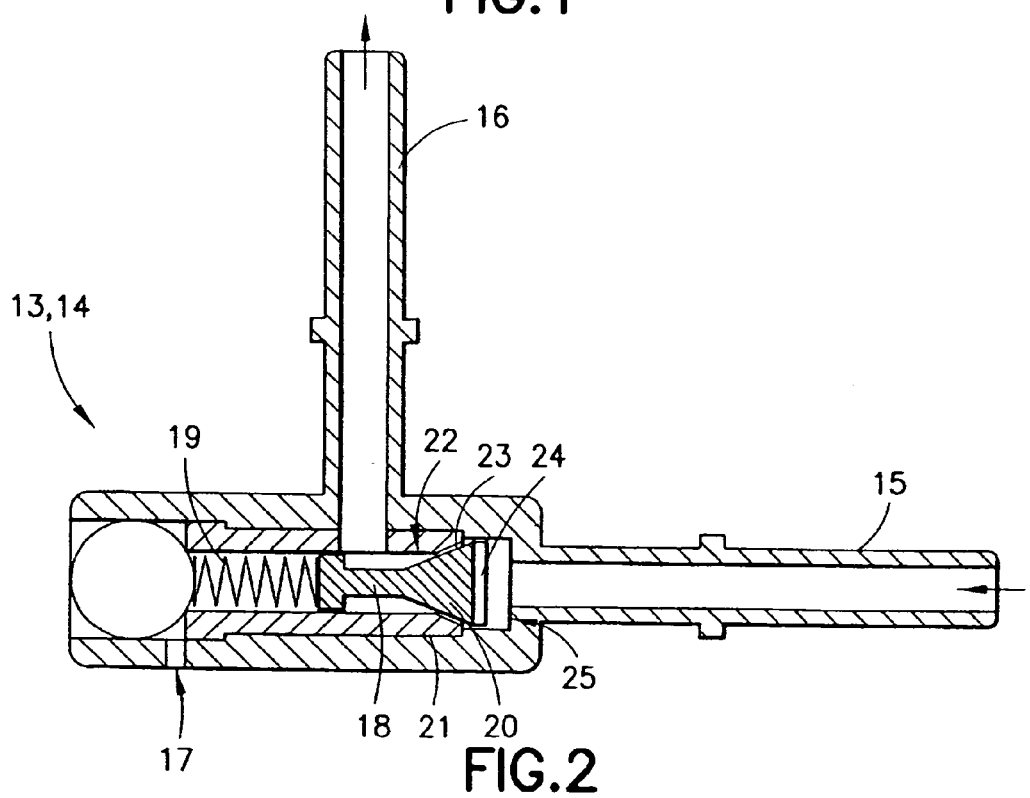
FIG. 2 shows a greatly enlarged sectional representation through a volume flow reducing valve of the fuel feed unit in FIG. 1.

FIG. 2 shows a sectional representation through one of the volume flow reducing valves 13, 14 of the fuel feed unit 2 in FIG. 1. The volume flow reducing valve 13, 14 has a first connecting branch 15 for the part of the pump fluid line 11, 12 leading to the feed line 8 in FIG. 1 and a second connecting branch 16 for the part of the pump fluid line 11, 12 leading to the suction jet pump 5, 6. In order to illustrate this, the fuel flows are indicated by arrows. The volume flow reducing valve 13, 14 furthermore has an opening 17 pointing into the fuel tank 1 in FIG. 1. A piston 18 is displaceably arranged in the volume flow reducing valve 13, 14 and is sealed off from the opening 17. A spring element 19 preloads the piston 18 in the direction of the first connecting branch 15. The piston 18 furthermore has a conical section 20, which faces a conical section 21 of a duct 22 leading to the second connecting branch 16. Naturally, in an alternative to this embodiment either the piston 18 or the duct 22 may be of cylindrical design. This means that the volume flow reducing valve 13, 14 has an annular gap 23 between the piston 18 and the duct 22, through which the fuel passes from the fuel pump 4 in FIG. 1 to the corresponding suction jet pump 5, 6.

As the delivery pressure of the fuel pump 4 increases, the pressure in the first connecting branch 15 rises. As a result the piston 18 is displaced against the force of the spring element 19. thereby reducing the annular gap. This leads to a restriction of the delivery of fuel to the suction jet pump 5, 6 represented in FIG. 1.

The section 20 of the piston 18 facing the annular gap 23 also carries a seal 24, which interacts with a step 25 in the connecting branch 15 formed to act as a seal seat. In the absence of a sufficient delivery pressure, for example when the fuel pump 4 is started up, the spring element 19 presses the seal 24 against the step 25, so that the volume flow reducing valve 13, 14 acts as starting valve during the starting phase.

The invention claimed is:

1. A fuel feed unit for feeding fuel from a fuel tank, having a fuel pump drawing in fuel from a swirl pot, a suction jet pump feeding fuel from the fuel tank into the swirl pot, and a pump fluid line led to the suction jet pump from the delivery side of the fuel pump, characterized in that a pressure-dependent volume flow reducing valve (13, 14) is arranged in the pump fluid line (11, 12) for restricting the fuel volume flow delivered to the suction jet pump (5, 6) as the delivery pressure of the fuel pump (4) increases.

2. The fuel feed unit as claimed in claim 1, characterized in that the volume flow reducing valve (13, 14) has a piston (18), preloaded by a spring element (19) against the delivery pressure of the fuel pump (4), that the piston (18) is displaceably arranged in a duct (22) and that a cross-section of an annular gap arranged between the piston (18) and the duct (22) diminishes as the piston (18) is moved against the force of the spring element (19).

3. The fuel feed unit as claimed in claim 1 or 2, characterized in that the piston (18) has a section (20) with a widening, preferably conical, cross section opposed to a control edge of the duct (22).

4. The fuel feed unit as claimed in claim 3, characterized in that the duct (22) has a widening, preferably conical section (21).

5. The fuel feed unit as claimed in claim 1, characterized in that the volume flow reducing valve (13, 14) has an opening (17) provided for arrangement in the fuel tank (1) and that the side of the piston (18) remote from the delivery pressure has a connection to the opening (17).

6. The fuel feed unit as claimed in claim 2, characterized in that piston (18) is preloaded by means of a spring element (19) into its position opening up the pump fluid line (11, 12).

* * * * *